United States Patent [19]
Schreiner

[11] Patent Number: 5,853,116
[45] Date of Patent: Dec. 29, 1998

[54] STORAGE UNIT FOR TRUCKS

[76] Inventor: Harry L. Schreiner, P.O. Box 27546, Denver, Colo. 80227

[21] Appl. No.: 827,382

[22] Filed: Mar. 27, 1997

[51] Int. Cl.[6] .................................................... B60R 9/00
[52] U.S. Cl. ......................... 224/404; 224/498; 224/542; 296/37.6; 220/4.29
[58] Field of Search ................... 224/404, 498, 224/499, 542, 403; 296/37.6; 220/4.29, 6

[56] References Cited

U.S. PATENT DOCUMENTS

| | | | |
|---|---|---|---|
| 1,292,452 | 1/1919 | Friedman | 224/498 |
| 1,941,860 | 1/1934 | Hanson | 224/499 |
| 1,972,483 | 9/1934 | Hartson | 220/6 |
| 3,727,971 | 4/1973 | Sisler | 224/404 |
| 4,451,075 | 5/1984 | Canfield | 296/37.6 |
| 4,749,226 | 6/1988 | Heft | 296/37.6 |
| 4,828,312 | 5/1989 | Kinkel et al. | 296/37.6 |
| 4,938,398 | 7/1990 | Hallsen | 224/404 |
| 5,083,829 | 1/1992 | Fonseca | 296/37.6 |
| 5,094,375 | 3/1992 | Wright | 224/404 |
| 5,207,469 | 5/1993 | Rossi | 296/37.6 |
| 5,299,704 | 4/1994 | Thorby | 220/6 |
| 5,464,264 | 11/1995 | Wilson | 296/37.6 |
| 5,498,049 | 3/1996 | Schlachter | 296/37.6 |
| 5,518,158 | 5/1996 | Matlack | 224/404 |
| 5,615,922 | 4/1997 | Blanchard | 224/404 |

*Primary Examiner*—Linda J. Sholl
*Attorney, Agent, or Firm*—Ramon L. Pizzaro; Edwin H. Crabtree

[57] ABSTRACT

A collapsible storage device which may be mounted on the bed of a truck as well as serve as a tailgate for the bed of the truck. The collapsible storage device includes a frame that is adapted for mounting in a substantially vertical orientation to the bed of the truck, the frame having a lower portion and an upper portion, the lower portion being designed for placement near the floor of the bed of the truck. A first panel that is hingedly attachable to the upper portion of the frame and a second panel that is mountable in a first position where the second panel is in a substantially vertical orientation from the second edge of the first panel, and a second position where the second panel may be placed between the first panel and the frame, so that in the first position the frame, the first panel and the second panel define a space below the first panel, and so that in the second position the second panel may be placed against the frame and the first panel folded against the second panel to store the second panel between the frame and the first panel.

12 Claims, 6 Drawing Sheets

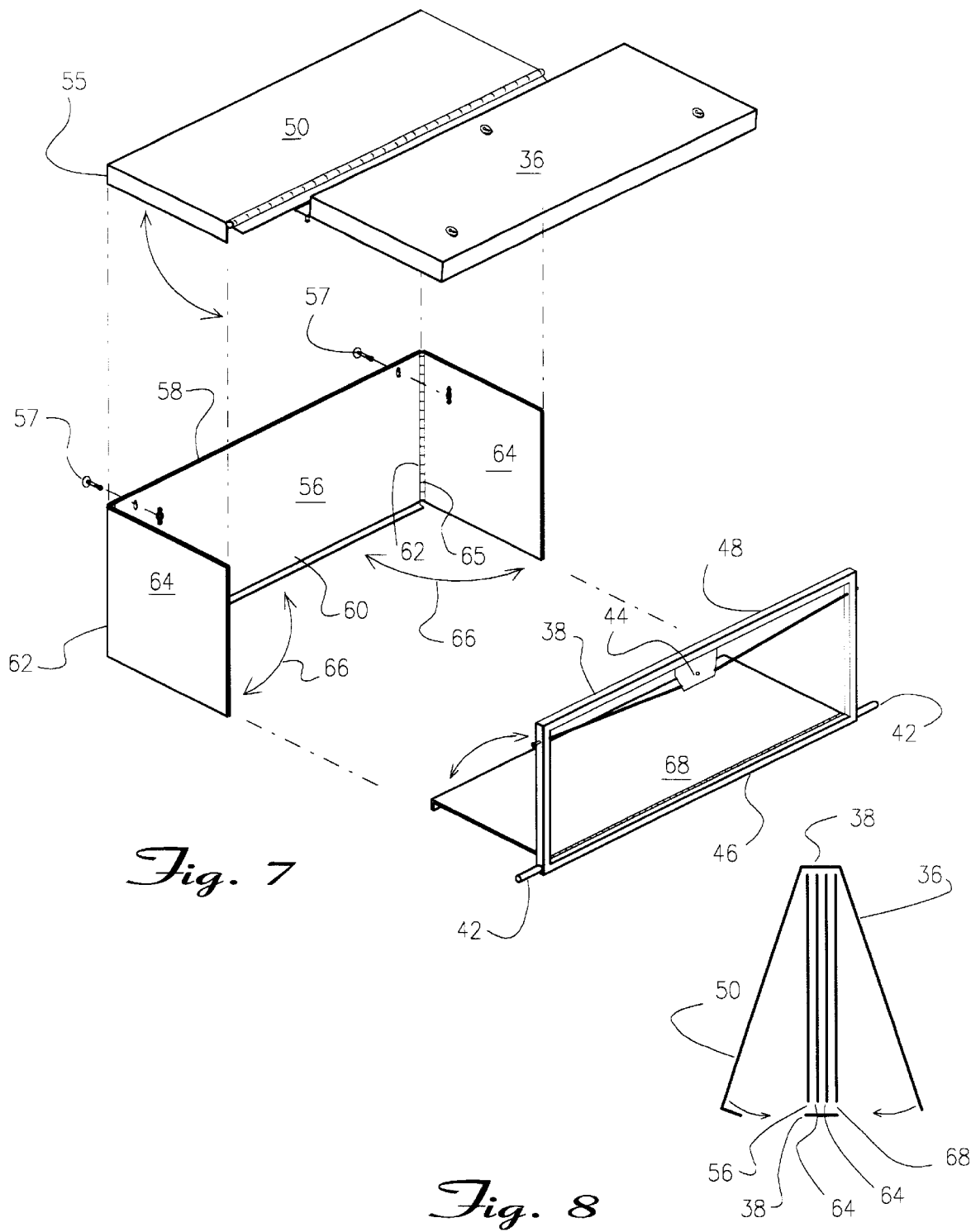

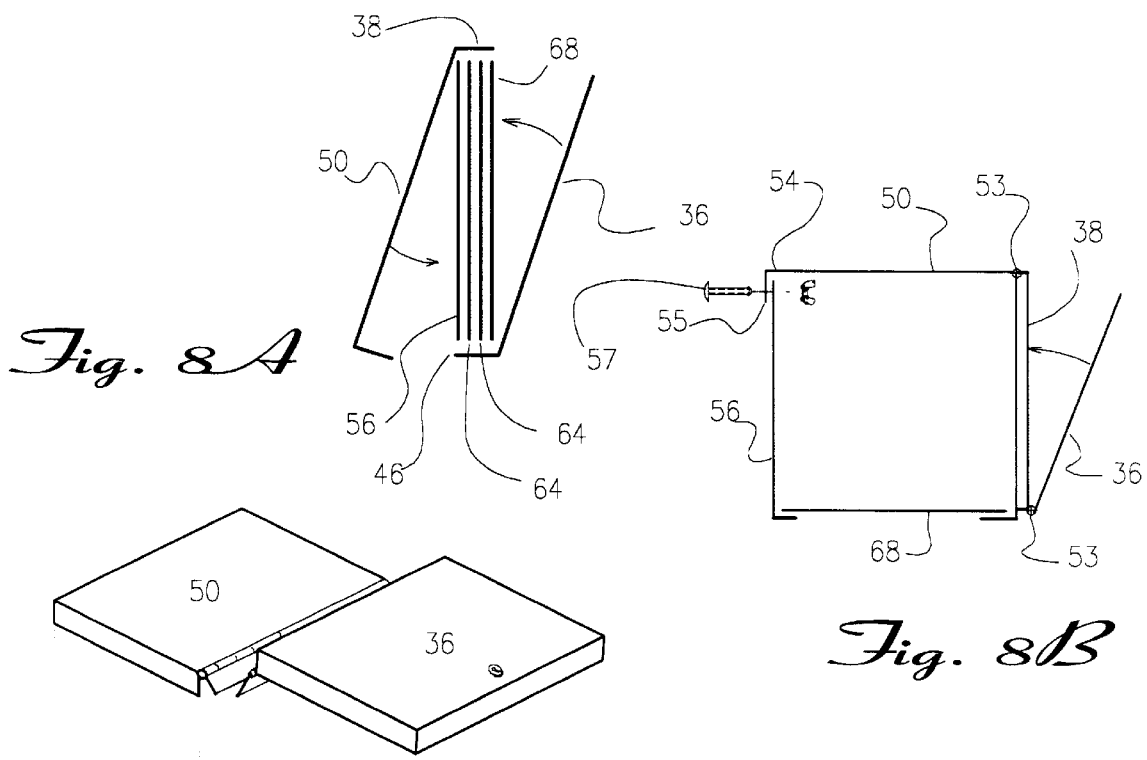
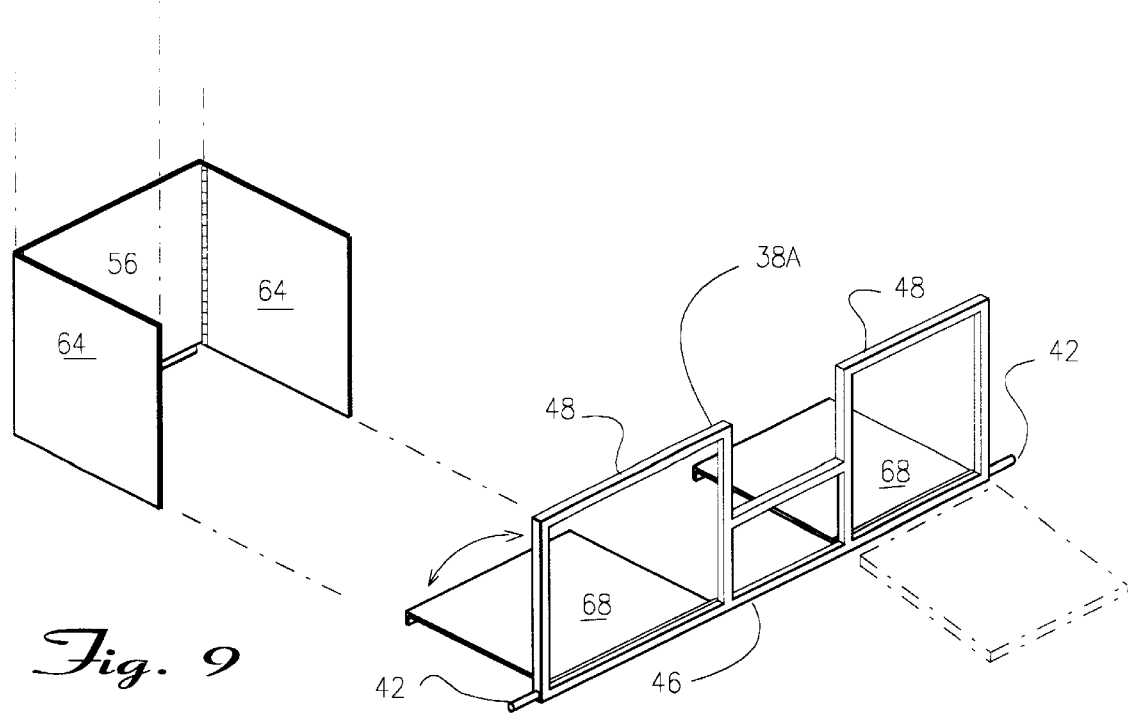

STORAGE UNIT FOR TRUCKS

BACKGROUND OF THE INVENTION (a) Field of the Invention

This invention generally relates to a collapsible storage unit for trucks, and more specifically, but not by way of limitation, to a collapsible storage unit and tailgate for trucks.

(b) Discussion of Known Art

The need for a collapsible storage device that can be mounted on the back of a pickup truck has long been recognized. However, attempts at providing a device that collapses without requiring permanent modifications of the bed of the truck have not been entirely successful.

An example of known art is taught in U.S. Pat. No. 5,498,049 to Schlachter. The Schlachter invention teaches a hinged storage device that attaches to the tailgate, and can move with the tailgate. Perhaps one of the greatest disadvantages of the Schlachter device is that it does not collapse. Thus, the Schlachter does not allow full use of the bed of the truck once the device is mounted.

Yet another known device is taught U.S. Pat. No. 5,464,264 to Wilson. The Wilson device includes panels that allow the storage device to collapse to allow full use of the bed of the truck. The Wilson device requires extensive modifications to the bed of the truck or the integration of the device into the bed of the truck.

A device that allows full use of the bed of the truck is taught in U.S. Pat. No. 5,207,469 to Rossi. The Rossi device uses several panels to form a box that mounts next to the tailgate of the bed of the truck. The Rossi device, while allowing substantially full use of the bed of the truck, is disadvantaged in that it must be attached at a single location on the bed of the truck. Moreover, the multiple panels of the Rossi device can be cumbersome to assemble and disassemble.

Still another storage device is taught in U.S. Pat. No. 5,083,829 to Fonseca. The Fonseca device fastens to the bed of the truck and cooperates with the tailgate of the truck to provide an aerodynamic storage box. The Fonseca device offers similar function and disadvantages as U.S. Pat. No. 4,938,398 to Hallsen and U.S. Pat. No. 4,451,075 to Canfield. Namely, the Fonseca, Hallsen, and Canfield devices cannot be conveniently collapsed so as to allow full use of the bed of the truck.

Devices that collapse to allow full use of the bed of the truck include U.S. Pat. No. 4,828,312 to Kinkel et al. and U.S. Pat. No. 4,749,226 to Heft. The Kinkel and Heft devices fasten to the bed of the truck and collapse over the bed of the truck. One significant disadvantage of the Kinkel and Heft devices is that the panes fold and store over the bed of the truck. This is a serious disadvantage since this exposes the panels to the loads of articles placed in the bed of the truck. Both the Kinkel and Heft invention include panels that are connected to one another by means of long hinges. It will be clear to those skilled in the art that, once the panels are collapsed over the bed of the truck, these hinges may be bent due to their length and exposure to the cargo area. A misalignment of the hinges will impede the folding of the hinges, and may even lead to a tearing away of the hinges from the panels.

SUMMARY

It has been discovered that the problems left unanswered by known art can be solved by providing a collapsible storage device that includes:

a) a frame that is adapted for mounting in a substantially vertical orientation to the bed of the truck, the frame having a lower portion and an upper portion, the lower portion being designed for placement near the floor of the bed of the truck;

b) a first panel having a first edge and a second edge, the first edge being hingedly attachable to the top portion of the frame; and c) a second panel, the second panel being mountable in a substantially vertical orientation against the second edge of the first panel, so that in one position the frame, the first panel and the second panel define a space below the first panel, and so in a second position the second panel may be placed against the frame and the first panel used to store the second panel between the frame and the first panel.

In a highly preferred embodiment of the invention the second panel includes an upper edge, a lower edge, and at least two side edges. The side edges include hinged panels that may be folded over the second panel, so that once hinged panels are folded over the second panel, the second panel together with the hinged panels may be placed against the frame and stored between the first panel and the frame.

Yet another structural feature of a highly preferred embodiment is that the device include a floor panel that is adapted to fit between the hinged panels and the second panel and near the floor of the pickup bed. This floor panel may attach to the hinged panels and the second panel, and is adapted for fitting between the second panel and the frame, so that the second panel, the hinged panels, and the floor panel may be stored between the first panel and the frame. Additionally, it is contemplated that an access door may be attached to the frame in order to allow closing of the entire enclosure.

Thus it will be appreciated that the frame may be equipped with mounting and locking hardware so as to enable a user to replace the tailgate on a truck with the instant invention, and thus provide a tailgate which can be expanded out to form a box. Additionally, a frame that supports a pair of spaced apart storage units as taught herein may be used to allow replacing of the tailgate and provide space between the storage units to allow attaching the hitch element of what is commonly known as a fifth wheel trailer to the bed of the truck.

Thus it will be appreciated that disclosed invention solves the problems of storage boxes which cannot be conveniently collapsed so as to allow full use of the bed of the truck to carry materials in a conventional manner.

Also, it will be appreciated that the instant invention provides new, useful results by providing a storage unit that may replace the tailgate of a truck and that may collapse to allow full use of the bed of the truck.

Still further, it will be appreciated that the instant invention provides a collapsible storage box which does not require permanent modifications or fastening to the structure of the truck.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 7 is an exploded view of another embodiment of the invention, the view illustrating an alternative direction of opening of the access door.

FIG. 8 is a schematic drawing illustrating the layering of the components when the embodiment shown on FIG. 7 in approximately its collapsed position.

FIG. 8A is a schematic drawing illustrating the layering of the components when the embodiments shown on FIGS. 4 and 6 in approximately their collapsed position.

FIG. 8B is a schematic of a side sectional view showing the arrangement of the frame and panels an embodiment of the invention in its expanded position.

FIG. 9 illustrates a frame and removable or fold-away louvered section that is preferably used with the tailgate embodiment that is adapted for used with vehicles towing a fifth wheel trailer.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
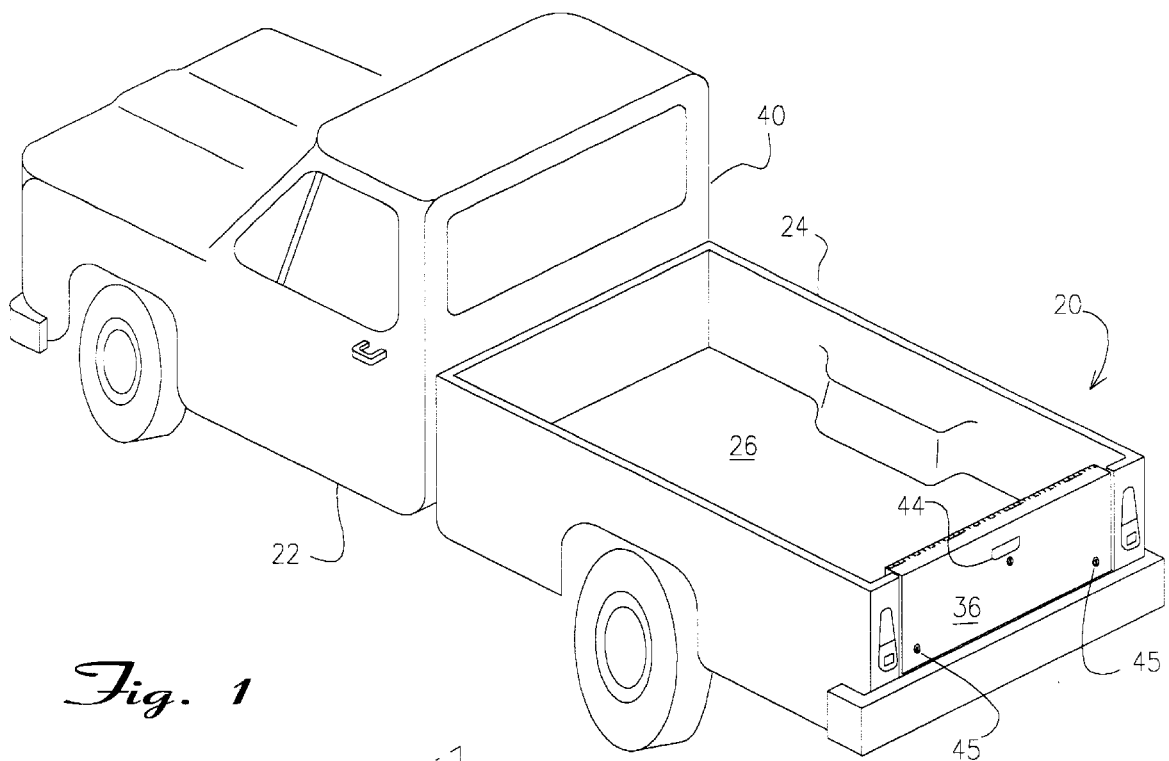
FIG. 1 is a perspective view of a preferred embodiment shown used as a tailgate.

Turning now to FIG. 1 where a collapsible storage device 20 made in accordance with the principles taught herein is shown mounted on a truck 22. The truck 22 includes a bed 24, the bed 24 having a floor 26 and support means 28 for accepting a tailgate. The collapsible storage device 20 has been shown in a collapsed position serving as a tailgate.

Figure 2:
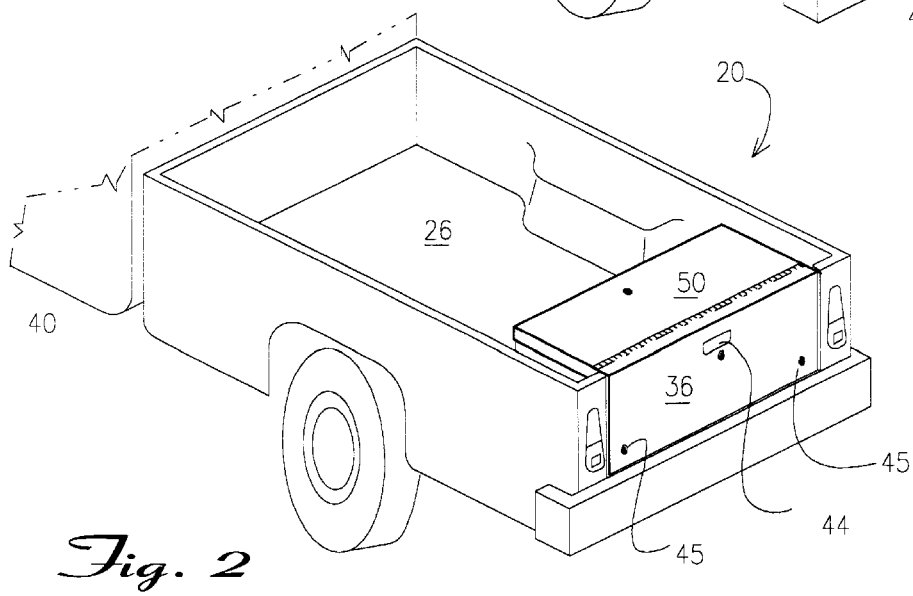
FIG. 2 is a perspective view of the embodiment shown on FIG. 1 expanded out to create a storage area.
Figure 3:
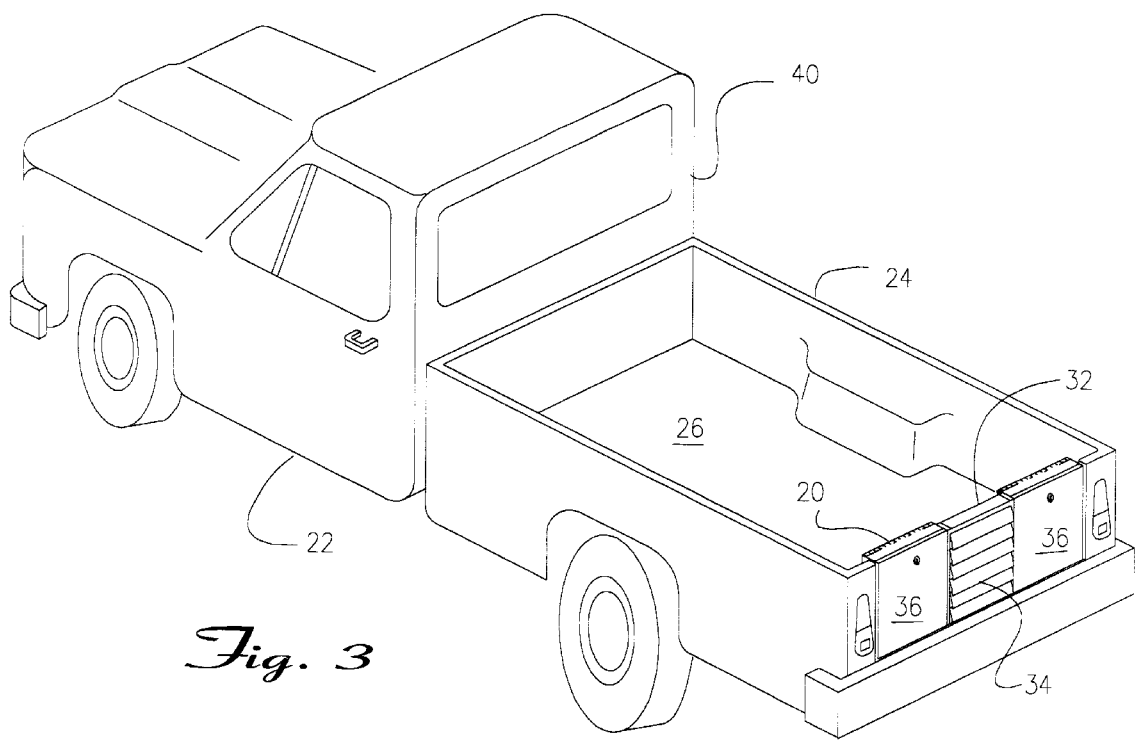
FIG. 3 is perspective view of pair of a highly preferred embodiment of the invention used to form a tailgate that may be used to tow a fifth wheel trailer.
Figure 4:
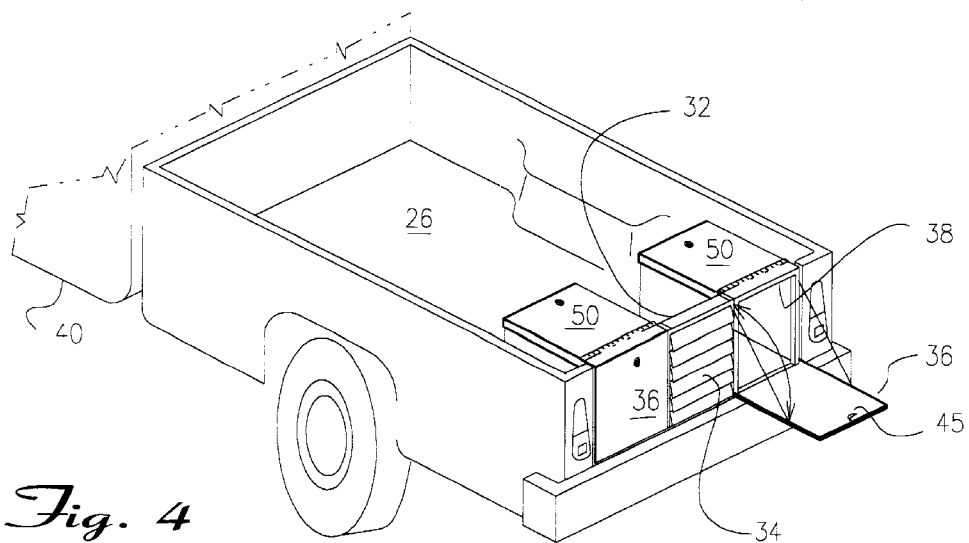
FIG. 4 is a perspective view of the embodiment shown on FIG. 3 with the storage devices in their expanded position.

Shown on FIG. 2 is the embodiment of the collapsible storage device 20 shown on FIG. 1 in its expanded position. As can be seen in FIGS. 3 and 4, two of the collapsible storage devices 20 can be used to form a tailgate with a mid portion 30 that includes a removable section 32. In a preferred embodiment the mid portion 30 includes louvers 34 that allow air to flow past the mid portion. The removable section 32 allows the use of the configuration shown on FIGS. 3 and 4 to allow the use of the truck 22 to tow what is known as a fifth wheel trailer. Fifth wheel trailers are large trailers that include a hitch section that attaches to a mating hitch that mounts over the bed 24 of the truck 22, instead of on a hitch on the bumper area of the truck. Thus, the attachment of a fifth wheel to the truck would typically require the removal of the tailgate or replacement of the tailgate with a tailgate that includes a notch or a passage that may accommodate the structure of the trailer's hitch structure.

Turning to FIGS. 6, 7, 9 and 10, it can be seen that the collapsible storage device 20 illustrated in FIGS. 1 and 3 includes a frame 38 that can be mounted in a substantially vertical position in the bed 24 of the truck 24. The frame 38 includes means for retaining the position of the frame 38 relative to the bed 24 of the truck 22. In a preferred embodiment these means for retaining the position of the frame relative to the bed of the truck includes a set of pins 42 and a latching mechanism 44. The pins will preferably match the size and arrangement of the pins found on a standard tailgate, so that the frame may fit into the tailgate support means 28 that are found on the bed 24 of the truck.

Figure 6:
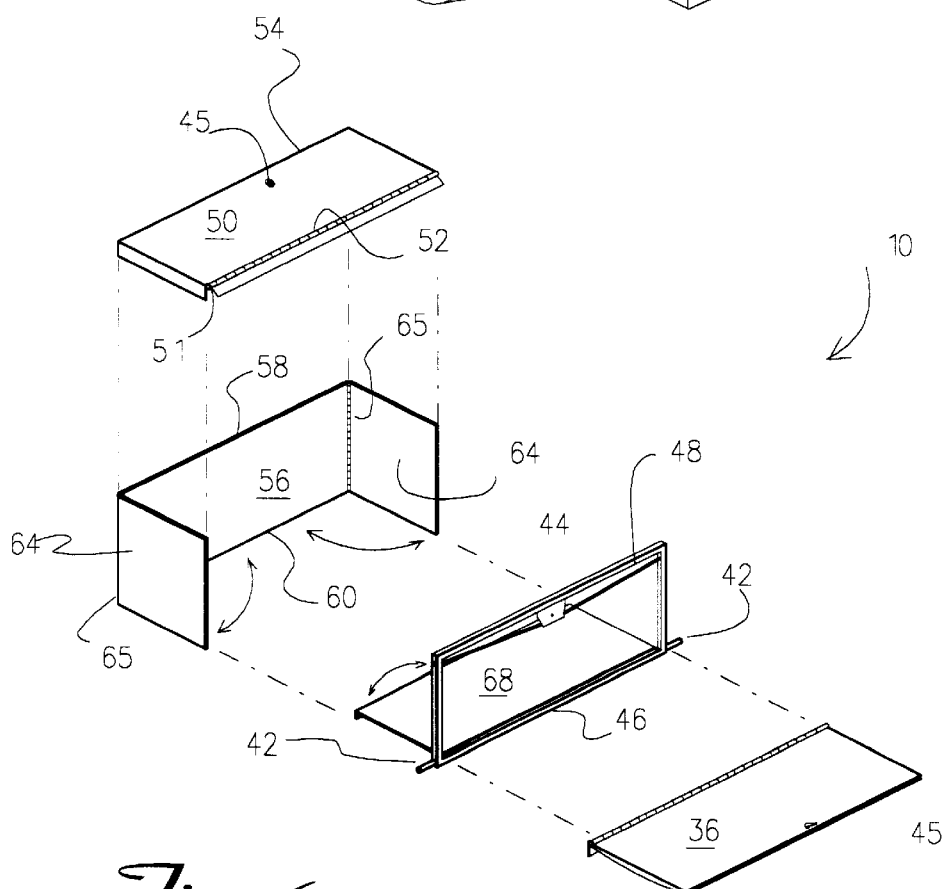
FIG. 6 is an exploded view indicating the assembly arrangement of the components of an embodiment of the invention, the view illustrating the preferred direction of opening of the access door.

Also shown on FIG. 6 is that the frame 38 includes means for mounting the frame a substantially vertical orientation relative to the bed 24 of the truck 22. In the embodiment shown on FIG. 6 the frame 38 includes a latching mechanism 44 that cooperates with the pins 42 to keep the frame 38 in a substantially vertical position. Thus, the pins 42 and the latching mechanism 44 are placed on the frame 38 so as to cooperate with the mounting hardware used on the truck's original tailgate, so that the support means on the bed 24 will hold the frame 38 in a substantially vertical position.

It is important to note that while the invention has been shown serving as a tailgate, it is contemplated that the structure and principles taught herein allow the manufacture and use of the collapsible storage device 20 anywhere within the bed 24 of the truck 24. Thus it is contemplated that the instant invention may be placed near the cab 40 of the truck 24, with the frame including adjustable means such as turn screws, telescoping legs, or the like to keep the frame in a substantially vertical orientation when the device is in a collapsed position. However, the structure of the instant invention is particularly well suited for use of the device in place the tailgate found in most trucks.

Figure 5:
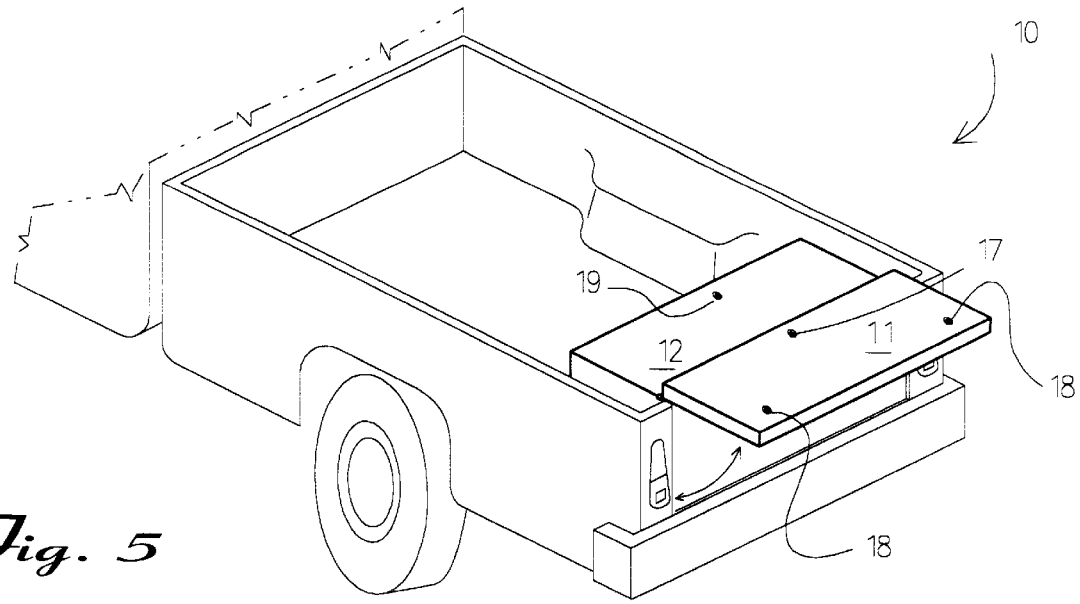
FIG. 5 illustrates the opening of the access door of an embodiment of the invention.

Also shown on FIGS. 1 and 3 is an access door 36 which allows complete enclosure of the collapsible storage device 20 and access to its interior area. In a preferred embodiment the access door 36 is mounted to the frame 38 by means for pivoting the access door on the frame. In a preferred embodiment these means for pivoting the access door includes a hinge 51. In a highly preferred embodiment the hinge 51 is attached to the lower portion 46 of the frame 38. This attachment has been shown on FIG. 4 and 6. In another embodiment, shown on FIG. 5, the hinge 51 has been attached to the upper portion 48 of the frame 38, allowing the access door 36 to open by lifting the access door.

Turning now to FIGS. 6, 7, 9 and 10, where it has been illustrated that the frame 38 of the collapsible storage device 20 includes a lower portion 46 and an upper portion 48. The lower portion 46 being designed for placement near the floor 26 of the bed 24 of the truck 22. Attachable to the upper portion 48 of the frame 38 is a first panel 50 having a first edge 52 and a second edge 54. The first edge 52 will preferably be hingedly attachable to the upper portion 48 of the frame 38. To create a storage area, a second panel 56 with an upper edge 58, a lower edge 60, and side edges 62 is used in cooperation with the first panel 50. To create a storage area the upper edge 58 of the second panel 56 is mounted against the second edge 54 of the first panel 50, as shown on FIG. 8B, so that the second panel 52 is in a substantially vertical position relative the floor 26 of the bed 24 of the truck 22, defining a first position where the second panel 56 is in a substantially vertical orientation from the second edge of the first panel.

Also shown on FIGS. 7 and 8B is that the first panel 50 will preferably include a rim 55 which will extend along the second edge 54 of the first panel 50. The rim 55 will preferably have apertures for accepting at least one fastener 57, which serves as a means for securing the second edge 54 of the first panel 50 against the upper edge 58 of the second panel 56.

As shown on FIG. 7, a highly preferred embodiment of the invention also includes hinged panels 64 hingedly attached to by hinges 65 at each of the side edges 62 of the second panel 56. Each hinged panel 64 may fold in towards the second panel 56 as indicated by arrow 66. By folding the hinged panels 64 against the second panel 56 one can collapse the storage device 20 from the first position where a storage area 67 has been defined between the frame 38, the first panel 50, and the second panel 56 to a second position where the second panel 56, along with the hinged panels 64, is placed between the first panel 50 and the frame 38 to collapse the entire assembly as shown on FIGS. 1 and 3.

Also shown on FIGS. 6 through 9 is a floor panel 68 that is adapted to fit between the hinged panels 64 and the second panel 56 and near the floor 26 of the truck's bed. This floor panel 68 may cooperate with the hinged panels 64 and the second panel 56 by attachment means such as a tongue in groove joint or other releasable mechanical connections. Also, the floor panel 68 may attach to the lower portion 46 of the frame 38. Thus, while the floor panel 68 has been shown attached to the frame 68, it is contemplated that the floor panel be hingedly connected to the frame, as well as removably attached to the frame. Shown on FIGS. 8 and 8A is that the floor panel 68 is adapted for fitting between the second panel 56 and the frame 38, so that the second panel 56, the hinged panels 64, and the floor panel 68 may be stored between the first panel 50 and the frame 38 when the invention is in its second, or collapsed, position.

Figure 10:
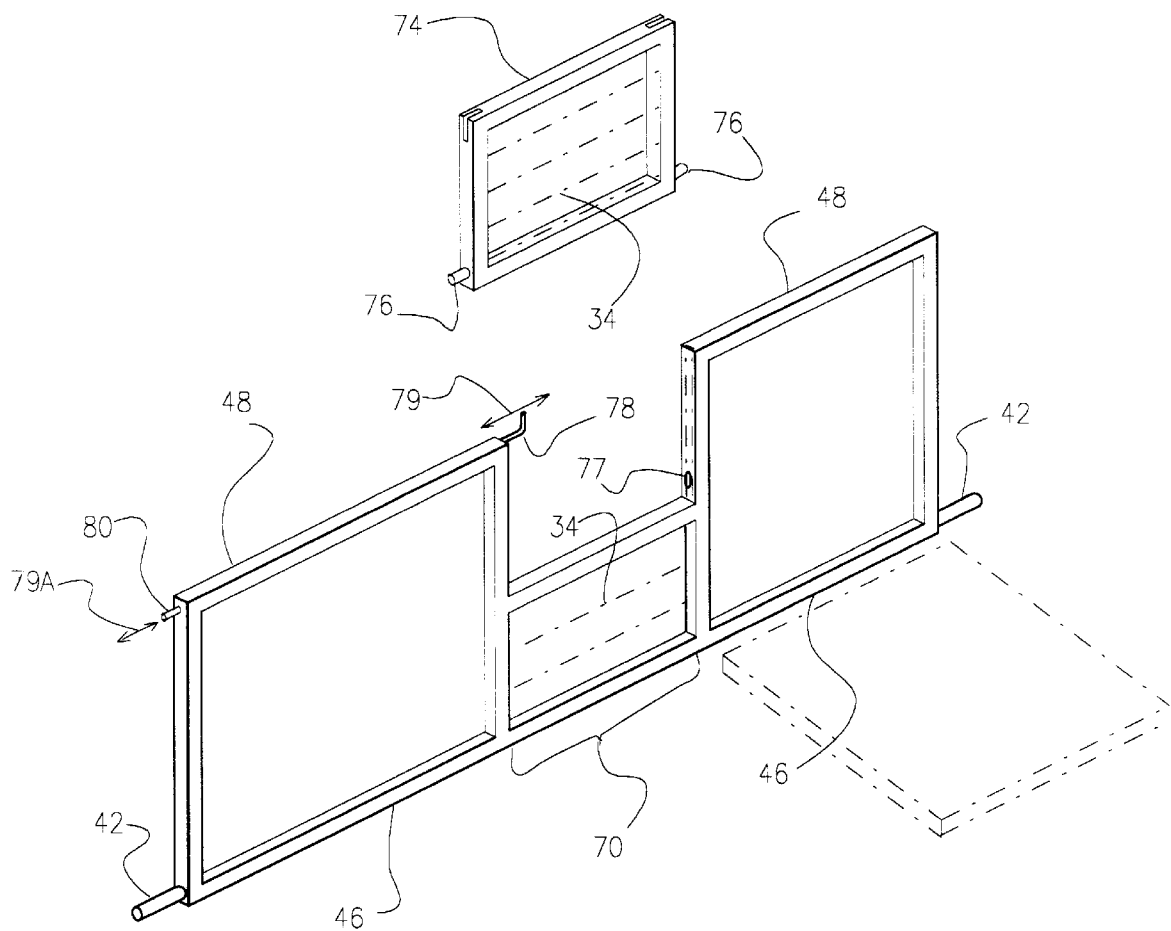
FIG. 10 is an enlarged view of the frame used the embodiment shown on FIG. 9.

Referring now to FIGS. 9 and 10, where components for a preferred embodiment for use with fifth wheels has been shown. The illustrated embodiment includes a frame 38A, which can support a pair of first panels 50 in a spaced apart relationship on the frame 38A. Thus the frame 38A includes a pair of upper portions 48 which have been placed in a spaced apart relationship and are used to support the first panels 50. Used in cooperation with the first panels 50 are second panels 56, as well as the hinged panels 64 and floor panels 68.

It is important to note that new and unexpected results have been achieved by the use of a pair of collapsible storage devices 20 in a spaced apart relationship. It has been discovered that by placing at least two of the collapsible storage devices 20, and providing a gap between the two devices as shown on FIG. 9, one can funnel the air flowing over the bed of the truck to form a tight, concentrated stream of air flowing over back of the truck. This concentrated stream of air lifts a fifth wheel trailer being towed and thereby reduces the vertical loads on the vehicle. Importantly, the concentration of the flow of air aids in keeping this flow of air under the fifth wheel trailer; an effect which minimizes turbulence between the towing vehicle and the fifth wheel trailer. It has been found that by reducing turbulence at this interface one improves the towing characteristics of the fifth wheel trailer by reducing air turbulence, which has the tendency to move the trailer from side to side.

Thus the embodiment shown on FIGS. 9 and 10 includes a centerpiece 70 which includes means for allowing air to flow through the centerpiece 70. In a preferred embodiment these means for allowing air to flow through the centerpiece 70 include louvers 34 that can swing to allow air to pass between the louvers 34; however, it is contemplated that various types of mesh, other known means for allowing air to flow through the centerpiece 70 may be used as a means for allowing air flow.

The centerpiece 70 shown on FIGS. 9 and 10 includes an upper portion 74, which is preferably mounted to the frame by means of hinge pins 76 so that the upper portion can pivot away or be removed in order to provide a slot or space that allow the mounting of the hitch systems that are associated with a fifth wheel trailer. As shown on FIG. 10, the frame portion may include accepting holes 77 that will accept the hinge pins 76. However, it is important to note that while the preferred embodiment has been shown with hinge pins and mating accepting holes, it is contemplated that a track or other means for allowing removal or displacement of the upper portion 74 to expose a space for the fifth wheel trailer structure may be used. Thus the hinged structure shown on FIG. 10 incorporates the use of a release lever 78 which may be pulled in the directions indicated by arrow 79. Movement of the lever 78 would cause the movement of locking pin 80 in the direction indicated by arrow 79A. Clearly, the locking pin 80 may be inserted into a mating hole in the bed 24 of the truck 22. It is important to note that while the simple locking device discussed herein is the best method known, it is contemplated that other known locking and latching devices may be incorporated into and supported by the frame structure taught herein to allow the replacement of the instant invention into the existing fittings and structure of a vehicle on which the instant invention is to mounted.

Thus it will be appreciated that the frame may be equipped with mounting and locking hardware so as to enable a user to replace the tailgate on a truck with the instant invention, and thus provide a tailgate which can be expanded out to form a box. Additionally, a frame that supports a pair of spaced apart storage units as taught herein may be used to allow replacing of the tailgate and provide space between the storage units to allow attaching the hitch element of what is commonly known as a fifth wheel trailer to the bed of the truck.

Thus it can also be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A collapsible storage device for mounting on the bed of a truck, the bed of the truck having a floor and having means for accepting a tailgate, the collapsible storage device comprising:

a frame adapted for mounting in a substantially vertical orientation to the bed of the truck, the frame having a lower portion, an upper portion and sides, the lower portion being adapted for placement near the floor of the bed of the truck, the upper portion and sides being formed from elongate members having ends, the ends of the elongate members being connected to one another in order to support the upper portion at a distance from the lower portion to define an opening therethrough to allow access to the storage device;

a first panel having a first edge and a second edge, the first edge being hingedly attachable to the upper portion of the frame;

a door panel, the door panel being hingedly attached to said frame in a generally parallel arrangement relative to said first edge of said first panel;

and a second panel, said second panel being mountable in a first position where the second panel lies against said frame when the storage device is collapsed, and a second position where the second panel is spaced from and held in a substantially parallel fashion to said frame to form a storage area with said frame, said second panel is supported between the second edge of said first panel and the bed of the truck; when said second panel is against said first position said first panel swings over said second panel, holding said second panel in the substantially parallel fashion against said frame, and when said second panel is in the second position said first panel forms a top closure for the storage area and said door panel forms a side closure for the storage area thereby allowing dual access to the storage area by opening either said first panel or said door panel.

2. A collapsible storage device according to claim 1 wherein said frame further comprises means for mounting said frame in the means for accepting a tailgate of the bed of the truck.

3. A collapsible storage device according to claim 1 and further comprising a floor panel adapted for fitting between the first panel and said door panel, so that the floor panel may be stored between the first panel and the frame.

4. A collapsible storage device according to claim 1 wherein said second panel further comprises a pair of side panels hingedly attached to said second panel and adapted for folding over said second panel, so that said second panel together with said side panels may be stored between said first panel and against said frame.

5. A collapsible storage device for mounting on the bed of a truck, the bed of the truck having a floor and having means for accepting a tailgate, the collapsible storage device comprising:

a frame adapted for mounting in a substantially vertical orientation to the bed of the truck, the frame having a lower portion, an upper portion and sides, the lower portion being adapted for placement near the floor of the bed of the truck, the upper portion and sides being formed from elongate members having ends, the ends of the elongate members being connected to one another in order to support the upper portion at a distance from the lower portion to define an opening therethrough to allow access to the storage device;

a first panel having a first edge and a second edge, the first edge being hingedly attachable to the upper portion of the frame;

a door panel, the door panel being hingedly attached to said frame in a generally parallel arrangement relative to said first edge of said first panel;

and a second panel, said second panel being mountable in a first position where the second panel lies within said frame when the storage device is collapsed, and a second position where the second panel is spaced from and held in a substantially parallel fashion to said frame to form a storage area with said frame, said second panel is supported between the second edge of said first panel and the bed of the truck; when said second panel is in said first position said first panel swings over said second panel, holding said second panel in the substantially parallel fashion in said frame, and when said second panel is in the second position said first panel forms a top closure for the storage area and said door panel forms a side closure for the storage area thereby allowing dual access to the storage area by opening either said first panel or said door panel.

6. A collapsible storage device according to claim 5 wherein said frame further comprises means for mounting said frame in the means for accepting a tailgate of the bed of the truck.

7. A collapsible storage device according to claim 5 and further comprising a floor panel adapted for fitting between the first panel and the door panel, so that the floor panel may be stored between the first panel and the frame.

8. A collapsible storage device according to claim 5 wherein said second panel further comprises a pair of side panels hingedly attached to said second panel and adapted for folding over said second panel, so that said second panel together with said side panels may be stored between said first panel and said frame.

9. A collapsible storage device for mounting on the bed of a truck, the bed of the truck having a floor and having means for accepting a tailgate, the collapsible storage device comprising:

a frame adapted for mounting in a substantially vertical orientation to the bed of the truck, the frame having a lower portion, a pair of upper portions and sides, the lower portion being adapted for placement near the floor of the bed of the truck, the upper portions and sides being formed from elongate members having ends, the ends of the elongate members being connected to one another in order to support the upper portions at a distance from the lower portion to define an opening therethrough to allow access to the storage device;

a pair of first panels having a first edge and a second edge, the first edge being hingedly attachable to the upper portions of the frame;

a pair of door panels, each of the door panels being hingedly attached to said frame in a generally parallel arrangement relative to said first edge of each of said first panels;

and a pair of second panels, each of said second panels being mountable in a first position where the second panels lie within said frame when the storage device is collapsed, and a second position where the second panels are spaced from and held in a substantially parallel fashion to said frame to form a storage area with said frame, each of said second panels is supported between the second edge of each of said first panels and the bed of the truck; when each of said second panels is in said first position said first panels swing over each of said second panels, holding each of said second panels in the substantially parallel fashion in said frame, and when each of said second panels is in the second position each of said first panels form a top closure for the storage area and each of said door panels form a side closure for the storage area thereby allowing dual access to the storage area by opening either said first panels or said door panels.

10. A collapsible storage device according to claim 9 wherein said frame further comprises means for mounting said frame in the means for accepting a tailgate of the bed of the truck.

11. A collapsible storage device according to claim 9 and further comprising a pair of floor panels, each adapted for fitting between the first panels and the door panel, so that the floor panel may be stored between the first panel and the frame.

12. A collapsible storage device according to claim 9 wherein each of said second panels further comprises a pair of side panels hingedly attached to said second panel and adapted for folding over said second panel, so that said second panels together with said side panels may be stored within said frame.

\* \* \* \* \*